(12) United States Patent
Nishioka et al.

(10) Patent No.: US 12,001,551 B2
(45) Date of Patent: Jun. 4, 2024

(54) WARNING APPARATUS, CONTROL METHOD, AND PROGRAM

(71) Applicant: NEC Corporation, Tokyo (JP)

(72) Inventors: Jun Nishioka, Tokyo (JP); Yoshiaki Sakae, Tokyo (JP); Kazuhiko Isoyama, Tokyo (JP); Etsuko Ichihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 17/439,509

(22) PCT Filed: Mar. 25, 2019

(86) PCT No.: PCT/JP2019/012496
§ 371 (c)(1),
(2) Date: Sep. 15, 2021

(87) PCT Pub. No.: WO2020/194449
PCT Pub. Date: Oct. 1, 2020

(65) Prior Publication Data
US 2022/0156371 A1    May 19, 2022

(51) Int. Cl.
*G06F 21/00*    (2013.01)
*G06F 21/56*    (2013.01)

(52) U.S. Cl.
CPC ........ *G06F 21/56* (2013.01); *G06F 2221/034* (2013.01)

(58) Field of Classification Search
CPC .. G06F 21/56; G06F 2221/034; G06F 21/566; G06F 21/554
See application file for complete search history.

(56) References Cited

U.S. PATENT DOCUMENTS

2013/0113382 A1    5/2013   Kitahara et al.
2013/0318604 A1*  11/2013   Coates ................ H04L 63/1416
                                                        726/22

(Continued)

FOREIGN PATENT DOCUMENTS

JP    2008-152556 A    7/2008
JP    2013-098915 A    5/2013

(Continued)

OTHER PUBLICATIONS

International Search Report for PCT Application No. PCT/JP2019/012496, dated Jun. 18, 2019.

(Continued)

*Primary Examiner* — Ka Shan Choy

(57) ABSTRACT

A warning apparatus (2000) acquires first detected event information (10) representing, at a first abstraction level, an event set being a set of events having occurred in a target system. The warning apparatus (2000) generates second detected event information (20) from the first detected event information (10). The second detected event information (20) represents, at a second abstraction level, the event set represented by the first detected event information (10). The warning apparatus (2000) determines, from among a plurality of pieces of threat information (30) each representing a threat activity, the threat information (30) having a high degree of relevance to at least either of the first detected event information (10) and the second detected event information (20). The warning apparatus (2000) generates warning information (40) relating to a threat being occurring in the target system, based on the determined threat information (30) and a matching level being an abstraction level associated with the detected event information having a high degree of relevance to the threat information (30).

21 Claims, 11 Drawing Sheets

(56) References Cited

U.S. PATENT DOCUMENTS

| | | |
|---|---|---|
| 2014/0281760 A1 | 9/2014 | Yoshizawa et al. |
| 2016/0042179 A1 | 2/2016 | Weingarten et al. |
| 2016/0065613 A1* | 3/2016 | Cho .................... H04L 63/1416 726/23 |
| 2017/0142149 A1* | 5/2017 | Coates ................ H04L 63/1408 |
| 2019/0370462 A1* | 12/2019 | Nurmi ................... G06F 21/552 |
| 2020/0120109 A1* | 4/2020 | Shu ......................... H04L 63/20 |
| 2020/0120118 A1* | 4/2020 | Shu .......................... G06F 21/54 |
| 2020/0193030 A1 | 6/2020 | Ikeda |
| 2020/0201989 A1* | 6/2020 | Shu ........................ G06F 21/577 |
| 2020/0201996 A1 | 6/2020 | Ikeda |

FOREIGN PATENT DOCUMENTS

| | | | |
|---|---|---|---|
| JP | 2017-527931 A | 9/2017 | |
| WO | 2013/098915 A1 | 7/2013 | |
| WO | WO-2013164821 A2 * | 11/2013 | ........... G06F 21/552 |
| WO | O2018/070404 A1 | 4/2018 | |
| WO | 2019/049243 A1 | 3/2019 | |

OTHER PUBLICATIONS

Shibata, Hitoshi, et al., "A Design of User-Interface for Manual Network Access Control of Malware Sandbox Analysis", IPSJ SIG Technical Reports, Feb. 26, 2009, vol. 2009, No. 20, pp. 277-282.
JP Office Action for JP Application No. 2021-508423, dated Aug. 9, 2022 with English Translation.

* cited by examiner

FIG. 5

| TERMINAL IDENTIFICATION INFORMATION | SUBJECT INFORMATION | | | OBJECT INFORMATION | | CONTENT INFORMATION | OCCURRENCE TIME |
|---|---|---|---|---|---|---|---|
| | PROCESS ID | THREAD ID | PATH | TYPE | IDENTIFICATION INFORMATION | | |
| TERMINAL A | 010 | 001 | C¥dir11/a1.exe | PROCESS | D¥dir21/dir22/a2.exe | START | 2018/1/10 10:05:24 |
| TERMINAL B | 010 | 002 | C¥dir11/a1.exe | FILE | D¥dir23/b2.conf | WRITE | 2018/1/10 10:06:02 |
| TERMINAL C | 013 | – | C¥dir15/b1.exe | SOCKET | socket1 | READ | 2018/1/11 9:06:02 |
| ××× | ××× | ××× | ××× | ××× | ××× | ××× | ××× |

WARNING APPARATUS, CONTROL METHOD, AND PROGRAM

This application is a National Stage Entry of PCT/JP2019/012496 filed on Mar. 25, 2019, the contents of all of which are incorporated herein by reference, in their entirety.

TECHNICAL FIELD

The present invention relates to detection of a threat in a computer system.

BACKGROUND ART

In a computer system, a threat such as malware may occur. Therefore, a technique for monitoring a computer system with respect to such a threat has been developed.

A technique in PTL 1, for example, extracts, based on a result of analyzing a form of transmission/reception of data in a target system, a threat supposed in the target system from a threat cases database. The invention outputs, for example, information in which a threat in that "a user is impersonated" is supposed with respect to execution of processing in that "a general user transmits, via the Internet, an ID and a password by using plaintext without enciphering".

CITATION LIST

Patent Literature

[PTL 1] Japanese Patent Application Publication No. 2008-152556

SUMMARY OF INVENTION

Technical Problem

In PTL 1, only a threat that occurs in relation to transmission/reception of data is a target. Therefore, it is difficult to detect a threat generated based on a cause other than transmission/reception of data.

The present invention has been made in view of the above-described problem, and one object of the present invention is to provide a technique capable of detecting occurrence of various threats.

Solution to Problem

A warning apparatus according to the present invention includes: 1) a first generation unit that acquires first detected event information representing, at a first abstraction level, an event set being a set of events having occurred in a target system, and generates second detected event information representing, at a second abstraction level, the event set represented by the acquired first detected event information; 2) a determination unit that determines, from among a plurality of pieces of threat information each representing a threat activity, the threat information having a high degree of relevance to at least either of the first detected event information and the second detected event information; and 3) a second generation unit that generates warning information relating to a threat being occurring in the target system, based on the determined threat information and a matching level being an abstraction level associated with the detected event information having a high degree of relevance to the threat information.

A control method according to the present invention is executed by a computer. The control method includes: 1) a first generation step of acquiring first detected event information representing, at a first abstraction level, an event set being a set of events having occurred in a target system and generating second detected event information representing, at a second abstraction level, the event set represented by the acquired first detected event information; 2) a determination step of determining, from among a plurality of pieces of threat information each representing a threat activity, the threat information having a high degree of relevance to at least either of the first detected event information and the second detected event information; and 3) a second generation step of generating warning information relating to a threat being occurring in the target system, based on the determined threat information and a matching level being an abstraction level associated with the detected event information having a high degree of relevance to the threat information.

A program according to the present invention causes a computer to execute each step included in the control method according to the present invention.

Advantageous Effects of Invention

According to the present invention, a technique capable of detecting occurrence of various threats is provided.

BRIEF DESCRIPTION OF DRAWINGS

The above-described object, other objects, features, and advantages will become more apparent from preferred example embodiments described below and the following accompanying drawings.

FIG. 5 is a diagram illustrating, based on a table format, a structure of information representing an event.

EXAMPLE EMBODIMENT

Hereinafter, an example embodiment according to the present invention is described by using the accompanying drawings. Note that, in all drawings, a similar component is assigned with a similar reference sign and description therefor is not repeated, as appropriate. Further, unless otherwise specifically described, in each block diagram, each block does not represent a configuration of a hardware unit but represents a configuration of a function unit.

Example Embodiment 1

Outline

Figure 1:
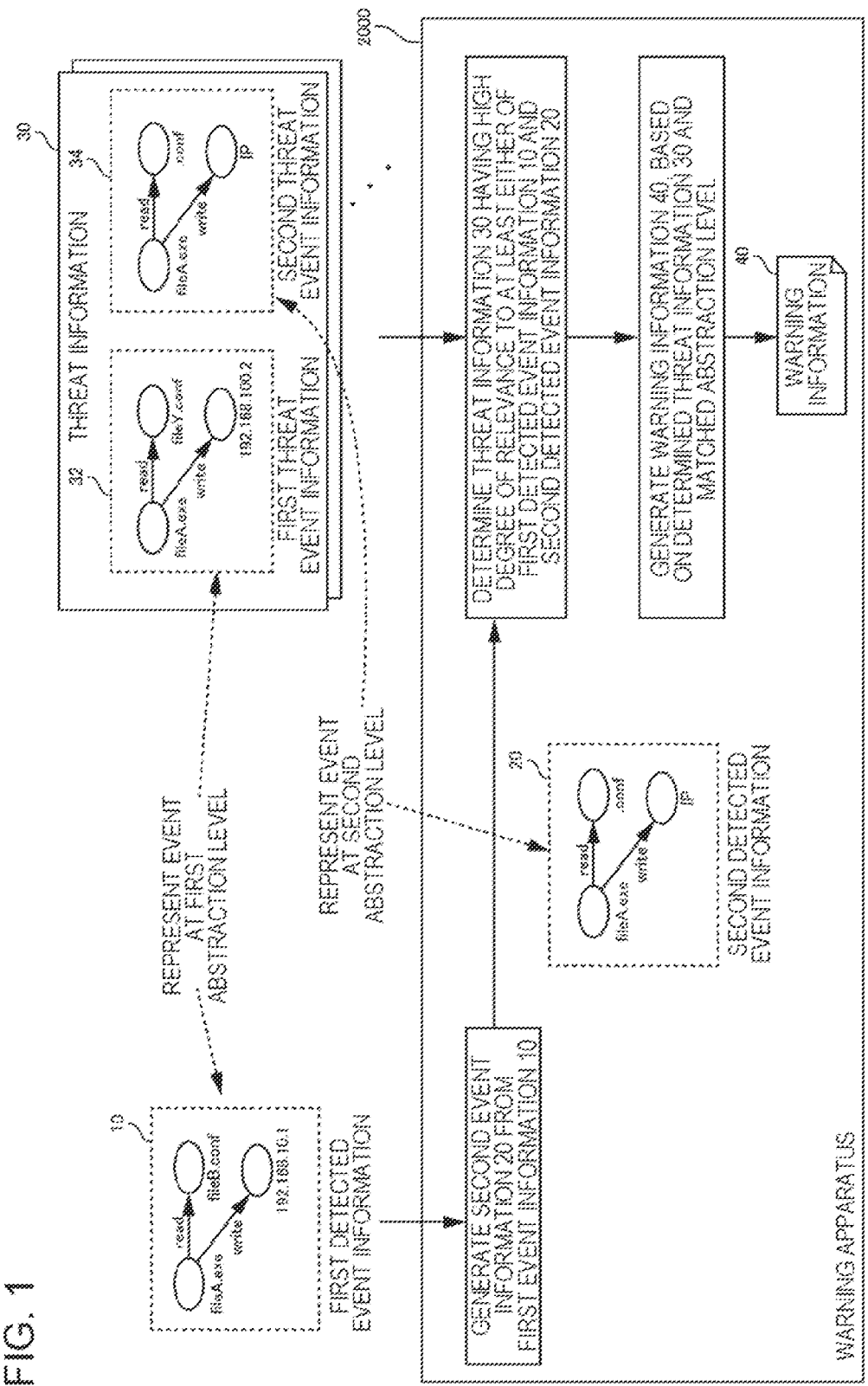
FIG. 1 is a diagram illustrating an outline of an operation of a warning apparatus according to an example embodiment 1.

FIG. 1 is a diagram illustrating an outline of an operation of a warning apparatus according to an example embodiment 1. FIG. 1 is a conceptual diagram for easily understanding an operation of a warning apparatus 2000, and does not specifically limit an operation of the warning apparatus 2000.

The warning apparatus 2000 determines, with respect to a set of events (a set of one or more events related to each other) having occurred in a system to be monitored (hereinafter, a target system), whether the event set represents any threat being occurring in the target system. As events, various events, for example, such as read/write of data by a process and start of another process can be handled. Then, when a threat represented by an event set is determined, the warning apparatus 2000 outputs warning information 40 relating to the threat.

Herein, a threat in a target system means an unauthorized operation for a system based on an unauthorized access, information leakage, and the like. For example, a fact that in a target system, malware is acting is one example of a threat.

In order to achieve the above-described function, the warning apparatus 2000 operates, for example, as follows. The warning apparatus 2000 acquires first detected event information 10. The first detected event information 10 represents, at a first abstraction level (a degree of abstraction), an event set (each of events) having occurred in a target system. Further, the warning apparatus 2000 generates, by using the first detected event information 10, second detected event information 20. The second detected event information 20 represents, at a second abstraction level, an event set (each of events) represented by the first detected event information 10.

Herein, an abstraction level as a method of representing an event means a degree of how much an event is abstractly represented. An event is more specifically represented as represented at a lower abstraction level. For example, in a case where a process being a subject of an event is represented by a name of an executable file and in a case where a process being a subject of an event is represented by a type (a type of an application such as a browser) of an executable file, it is conceivable that the former more specifically represents an event. Therefore, the representation of the former is lower in abstraction level than the representation of the latter.

Herein, a second abstraction level is higher in degree of abstraction than a first abstraction level. In other words, the second detected event information 20 is information in which an event set represented by the first detected event information 10 is represented at a higher degree of abstraction. For example, while the first detected event information 10 represents a subject and an object of an event by using identification information for the subject and the object of the event (e.g., a base name and an extension of a file name), the second detected event information 20 represents a subject and an object of an event by using information (e.g., an extension) representing a type of each of the subject and the object of the event. Hereinafter, the first detected event information 10 and the second detected event information 20 are also collectively referred to as detected event information.

Further, the warning apparatus 2000 uses threat information 30 previously determined for each of various threats. In threat information 30, a threat represented by the threat information 30 (a threat associated with the threat information 30) is represented by an event set.

More specifically, threat information 30 includes first threat event information 32 and second threat event information 34. In the first threat event information 32, an event set representing a threat is represented at a first abstraction level. On the other hand, in the second threat event information 34, an event set representing a threat is represented at a second abstraction level. In other words, first threat event information 32 and second threat event information 34 included in one piece of threat information 30 represent an event set representing the same threat at degrees of abstraction different from each other. Hereinafter, the first threat event information 32 and the second threat event information 34 are also collectively referred to as threat event information.

The warning apparatus 2000 determines, from among a plurality of pieces of threat information 30, threat information indicating threat event information having a high degree of relevance to detected event information. Specifically, threat information 30 indicating first threat event information 32 having a high degree of relevance to first detected event information 10 or indicating second threat event information 34 having a high degree of relevance to second detected event information 20 is determined.

Further, the warning apparatus 2000 generates warning information 40 relating to a threat being occurring in a target system, based on the determined threat information 30 and an abstraction level (hereinafter, a matching level) of the detected event information determined as having a high degree of relevance to the threat information 30. When it is determined that a degree of relevance between first detected event information 10 and first threat event information 32 of a certain piece of threat information 30 is high, a matching level becomes a first abstraction level. On the other hand, when it is determined that a degree of relevance between second detected event information 20 and second threat event information 34 of a certain piece of threat information 30 is high, a matching level becomes a second abstraction level. Then, the warning apparatus 2000 outputs the generated warning information 40.

Advantageous Effects

With the warning apparatus 2000 according to the present example embodiment, by comparing detected event information (information indicating a set of events having actually occurred in a target system) with threat information 30 (information indicating an event set representing a threat activity), threat information 30 having a high degree of relevance to the detected event information is determined. Thereby, threat information 30 representing a threat having a high probability of being occurring in a target system can be determined. Then, the warning apparatus 2000 generates/outputs warning information relating to the determined threat information 30. Therefore, a user (an administrator or a user of a target system) of the warning apparatus 2000 can easily recognize a threat having a possibility of being occurring in the target system.

Herein, as events, various events such as read/write of data by a process and start of another process can be handled. Therefore, with the warning apparatus 2000 according to the present example embodiment, occurrence of a threat can be detected with respect to various activities in a target system without limitation to transmission/reception of data.

Further, with the warning apparatus 2000 according to the present example embodiment, the same event set is represented at a plurality of abstraction levels having degrees of abstraction different from each other. Specifically, with respect to a set of events having actually occurred in a target system, first detected event information 10 representing the event set at a first abstraction level is acquired. Further, second detected event information 20 representing, at a second abstraction level, the event set represented by the first detected event information 10 is generated. Further, in threat information 30, an event set representing a threat activity is previously represented at a plurality of abstraction levels different from each other (first threat event information 32 and second threat event information 34).

The warning apparatus 2000 compares the first detected event information 10 with the first threat event information 32 and compares the second detected event information 20 with the second threat event information 34. Thereby, threat information 30 matched with an event set representing a threat activity can be determined, and in addition, it can be determined at how much degree of abstraction these are matched. Then, the warning apparatus 2000 generates warning information 40 by considering also the point in that "at how much abstraction level matching is made". Therefore, a user of the warning apparatus 2000 can recognize a threat having a possibility of being occurring in a target system and in addition, can recognize with how much probability the threat is occurring.

Hereinafter, the warning apparatus 2000 according to the present example embodiment is described in more detail.

<Example of Function Configuration of Warning Apparatus 2000>

Figure 2:
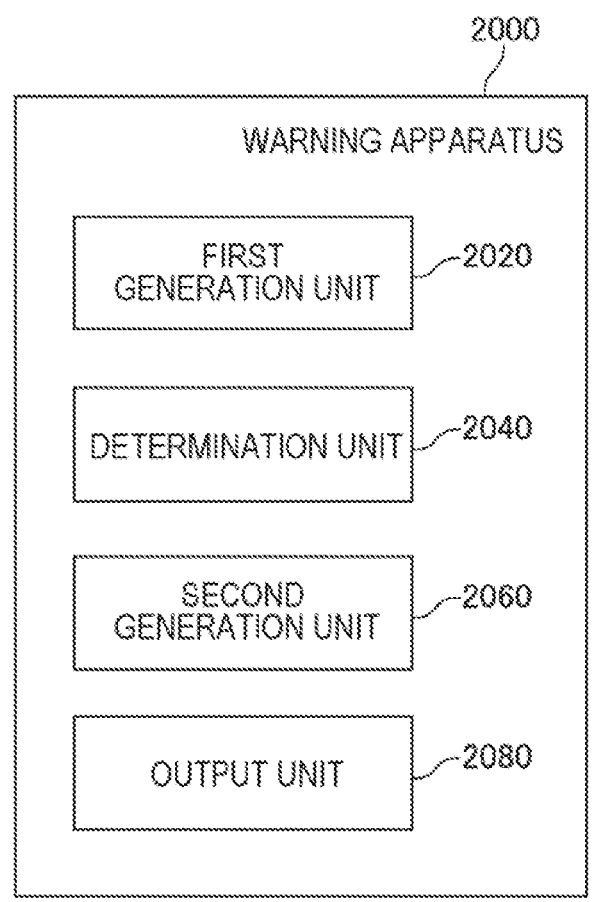
FIG. 2 is a diagram illustrating a configuration of a warning apparatus according to the example embodiment 1.

FIG. 2 is a diagram illustrating a configuration of the warning apparatus 2000 according to the example embodiment 1. The warning apparatus 2000 includes a first generation unit 2020, a determination unit 2040, a second generation unit 2060, and an output unit 2080. The first generation unit 2020 acquires first detected event information 10, and generates second detected event information 20 representing, at a second abstraction level, an event set represented by the first detected event information 10. The determination unit 2040 determines, from among a plurality of pieces of threat information 30, threat information 30 having a high degree of relevance to at least either of the first detected event information 10 and the second detected event information 20. The second generation unit 2060 generates warning information 40, based on the determined threat information 30 and an abstraction level associated with event information having a high degree of relevance to the threat information 30. The output unit 2080 outputs the warning information 40.

<Hardware Configuration of Warning Apparatus 2000>

Each of function-configuring units of the warning apparatus 2000 may be achieved by hardware (e.g., a hard-wired electronic circuit, and the like) for achieving each function-configuring unit or may be achieved by a combination of hardware and software (e.g., a combination of an electronic circuit and a program for controlling the electronic circuit, and the like). Hereinafter, a case where each of the function-configuring units of the warning apparatus 2000 is achieved by a combination of hardware and software is further described.

Figure 3:
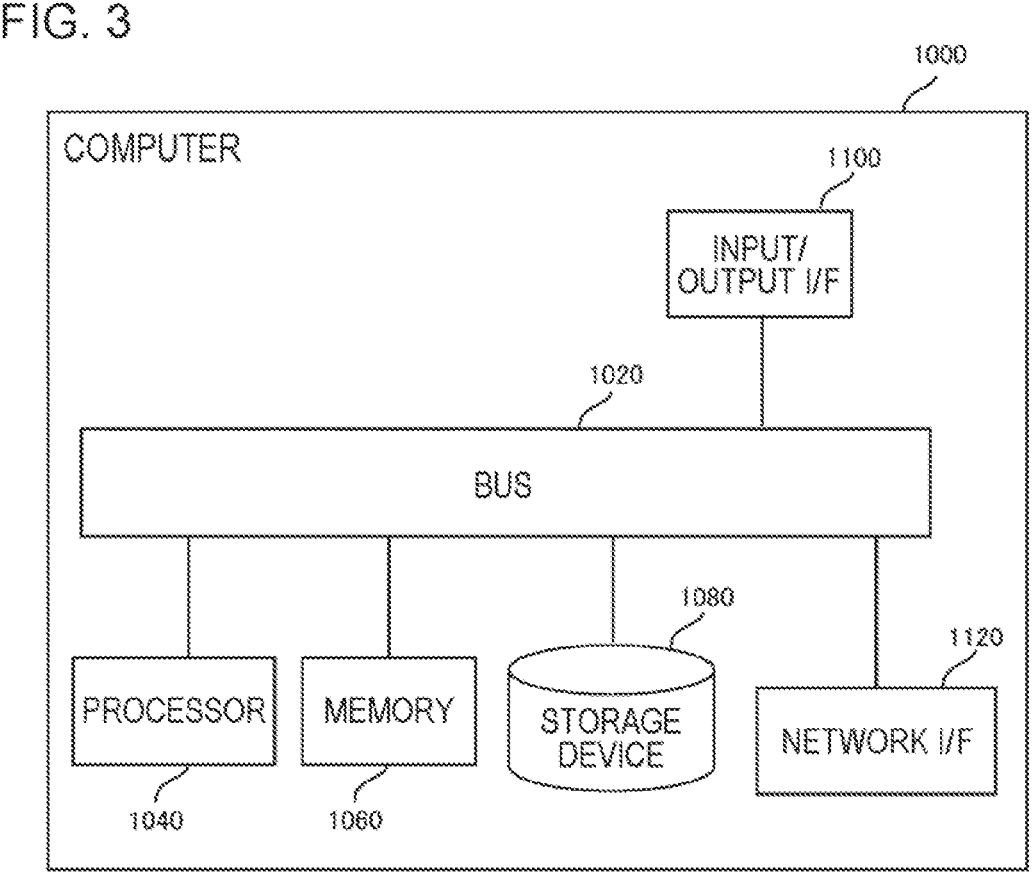
FIG. 3 is a diagram illustrating a computer for achieving the warning apparatus.

FIG. 3 is a diagram illustrating a computer 1000 for achieving the warning apparatus 2000. The computer 1000 is any computer. The computer 1000 is, for example, a personal computer (PC) or a stationary computer such as a server machine. In addition, the computer 1000 is, for example, a portable computer such as a smartphone and a tablet terminal. The computer 1000 may be a dedicated computer designed for achieving the warning apparatus 2000 or may be a general-purpose computer.

The computer 1000 includes a bus 1020, a processor 1040, a memory 1060, a storage device 1080, an input/output interface 1100, and a network interface 1120. The bus 1020 is a data transmission path where the processor 1040, the memory 1060, the storage device 1080, the input/output interface 1100, and the network interface 1120 mutually transmit/receive data. However, a method of mutually connecting the processor 1040 and the like is not limited to bus connection.

The processor 1040 is various processors such as a central processing unit (CPU), a graphics processing unit (GPU), and a field-programmable gate array (FPGA). The memory 1060 is a main storage apparatus achieved by using a random access memory (RAM) or the like. The storage device 1080 is an auxiliary storage apparatus achieved by using a hard disk, a solid state drive (SSD), a memory card, a read only memory (ROM), or the like.

The input/output interface 1100 is an interface for connecting the computer 1000 and an input/output device. The input/output interface 1100 is connected to, for example, an input apparatus such as a keyboard and an output apparatus such as a display apparatus.

The network interface 1120 is an interface for connecting the computer 1000 to a communication network. The communication network is, for example, a local area network (LAN) or a wide area network (WAN). A method of connection to a communication network by the network interface 1120 may be wireless connection or may be wired connection.

The storage device 1080 stores a program module that achieves each of function-configuring units of the warning apparatus 2000. The processor 1040 reads each of the program modules onto the memory 1060, executes the read program module, and thereby achieves a function relevant to each of program modules.

<Flow of Processing>

Figure 4:
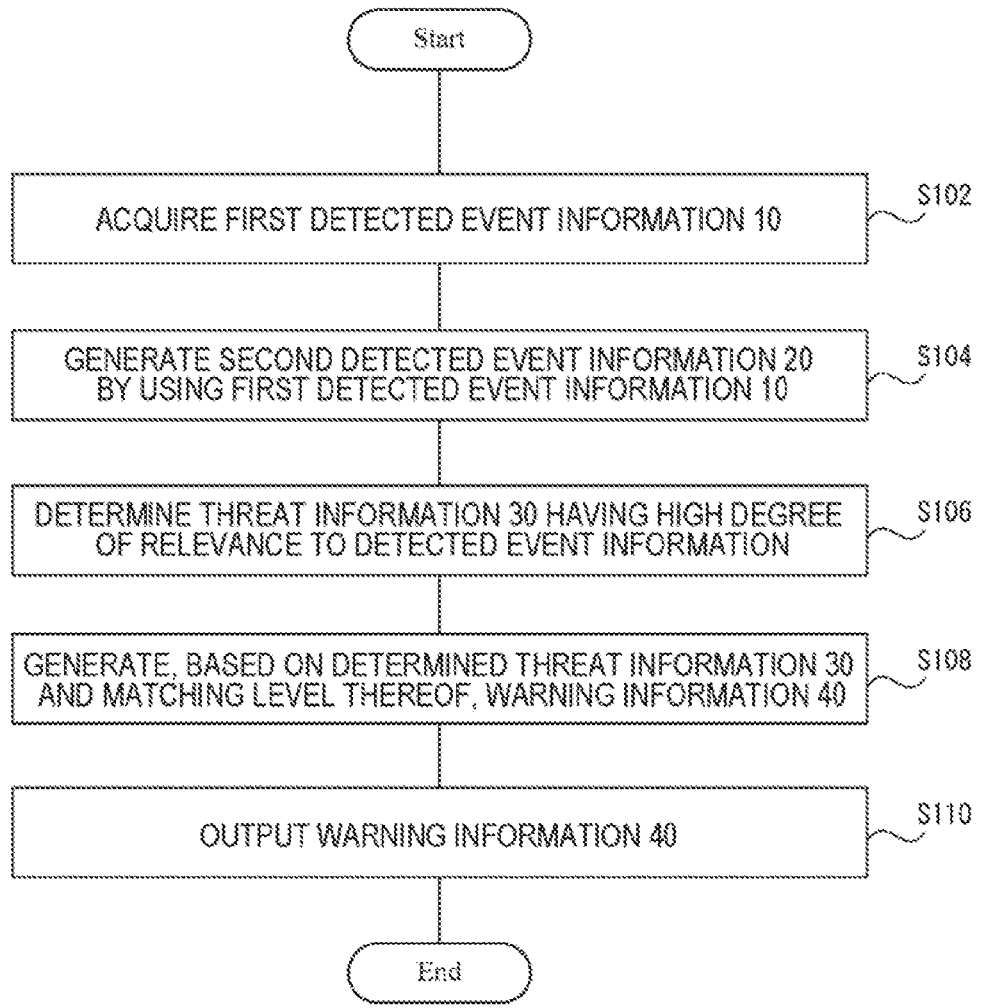
FIG. 4 is a flowchart illustrating a flow of processing executed by the warning apparatus according to the example embodiment 1.

FIG. 4 is a flowchart illustrating a flow of processing executed by the warning apparatus 2000 according to the example embodiment 1. The first generation unit 2020 acquires first detected event information 10 (S102). The first generation unit 2020 generates, by using the first detected event information 10, second detected event information 20 (S104). The determination unit 2040 determines, from among a plurality of pieces of threat information 30, threat information 30 having a high degree of relevance to detected event information (having a high degree of relevance to at least either of the first detected event information 10 and the second detected event information 20) (S106). The second generation unit 2060 generates, based on the determined threat information 30 and a matching level of the information, warning information 40 (S108). The output unit 2080 outputs the generated warning information 40 (S110).

Note that, a flow of processing executed by the warning apparatus 2000 is not limited to the flow of processing illustrated in FIG. 4. The warning apparatus 2000, for example, may compare, before generating the second detected event information 20, first threat event information 32 included in each piece of threat information 30 with the first detected event information 10, and generate the second detected event information 20 when threat information 30 including first threat event information 32 having a high degree of relevance to the first detected event information 10 does not exist. Then, the warning apparatus 2000 compares the generated second detected event information 20 with second threat event information 34 included in each piece of threat information 30, and thereby determines threat information 30 including the second threat event information 34 having a high degree of relevance to the second detected event information 20.

This point is similar to a case where information having a degree of abstraction equal to or more than a second abstraction level is handled as described later. In other words, the warning apparatus 2000 generates, when between detected event information of an nth abstraction level and threat event information of an nth abstraction level, information having a high degree of relevance is not found, detected event information of an (n+1)th abstraction level.

<Regarding Event>

An event indicates various matters that occur on a target system. An event represents, for example, an activity of a process operating on a target system (on any terminal included in the target system). An activity of a process is recorded, for example, in system call units. Note that, a terminal constituting a target system may be a physical machine or may be a virtual machine.

An event is represented, for example, by information indicating five elements which are identification information of a terminal where an event occurs, a subject of an event, an object of an event, a content of an activity executed by a subject with respect to an object, and an occurrence time. Therefore, information representing an event is roughly constituted of, for example, five items which are identification information of a terminal, subject information representing a subject, object information representing an object, content information representing a content of an activity, and an occurrence time.

Identification information of a terminal is any piece of information capable of identifying a terminal. For example, a network address (an IP address and a MAC address) of a terminal, a universally unique identifier (UUID), and the like are usable as identification information of the terminal.

Subject information is any piece of identification information capable of identifying a process being a subject. Hereinafter, information identifying a process is referred to as process identification information. Specifically, process identification information includes a process identifier (ID). However, process identification information for a process in which a plurality of threads operate further includes, in addition to a process ID, a thread ID.

Further, process identification information further includes information relating to an executable file of a process. Information relating to an executable file of a process is, for example, a name or a path of the executable file, a hash value of the executable file, a digital signature of the executable file, a name of an application achieved by the executable file, or the like.

Object information is, for example, a type and identification information of the object. A type of an object is, for example, a process, a file, a socket, or the like. When an object is a process, object information includes process identification information of the process.

When an object is a file, object information includes information (hereinafter, file identification information) identifying the file. File identification information is, for example, a name and a path of a file. Further, when an object is a file, object information may include a hash value of the file, a combination of an identifier of a file system and an identifier (an inode number and an object ID) of a disk block configuring a file on the file system, and the like.

When an object is a socket, object information includes, for example, an identifier allocated to a socket.

Content information is, for example, identification information allocated to various activity contents. Activity contents, for example, such as "starting", "stopping", "opening", "reading data", and "writing data" are allocated with identifiers different from each other. Note that, an access to a socket means an access to another apparatus associated with the socket.

FIG. 5 is a diagram illustrating, based on a table format, a structure of information representing an event. Hereinafter, a table in FIG. 5 is referred to as an event table 200. Each record in the event table 200 represents one event. The event table 200 roughly includes five items which are terminal identification information 201, subject information 202, object information 204, content information 206, and an occurrence time 207. The subject information 202 includes three items which are a process ID 208, a thread ID 209, and a path 210. The object information 204 includes two items which are a type 212 and identification information 214. The occurrence time 207 indicates a time at which an event occurs.

Herein, each event is generated by recording an activity of a process on a target system. As a technique for recording an activity of a process, an existing technique is usable.

<Regarding Event Set>

An event set is a set of one or more events related to one another. For example, a plurality of events coupled by an operation of "coupling, when an object of a certain event is a subject in another event, these events" are included in the same event set.

Herein, events having occurred on a system may be coupled and represented by a graph. An event set can be constituted, when events are coupled and represented by a graph in this manner, by a plurality of events constituting one graph. In FIG. 1, for example, an event group constituting one graph is handled as an event set.

Note that, even when an object of a certain event is a subject in another event, it is conceivable in some cases that these events are unrelated to each other. When, for example, occurrence times of the events are largely different, a probability in that the events are unrelated to each other is high. Therefore, as a condition for coupling events, a condition in that a difference between occurrence times of the events is equal to or less than a predetermined value may be further provided. Note that, as a specific condition provided for coupling events in this manner, various conditions used in an existing method of generating a graph by coupling events are usable.

Herein, a method of constituting an event set (a method of including a plurality of events in the same event set) is not limited only to a method of including, in the same event set, events to be coupled. In other words, each of events included in a plurality of graphs, which are not coupled with each other when connection between events is represented by a graph, may be included in the same event set.

Figure 6:
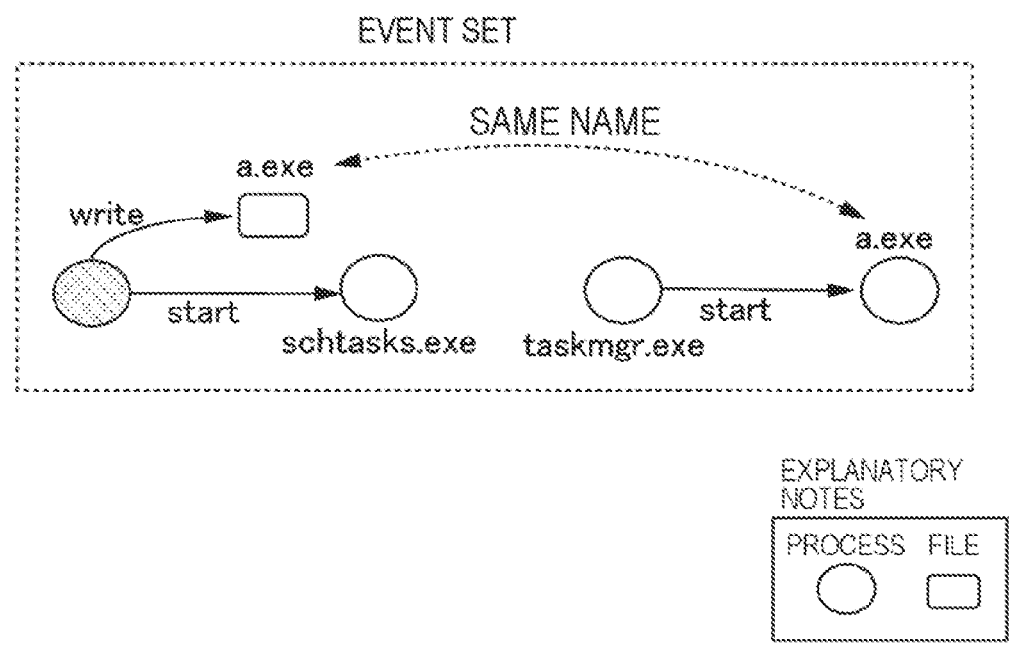
FIG. 6 is a diagram illustrating a method of constituting an event set.
Figure 7:
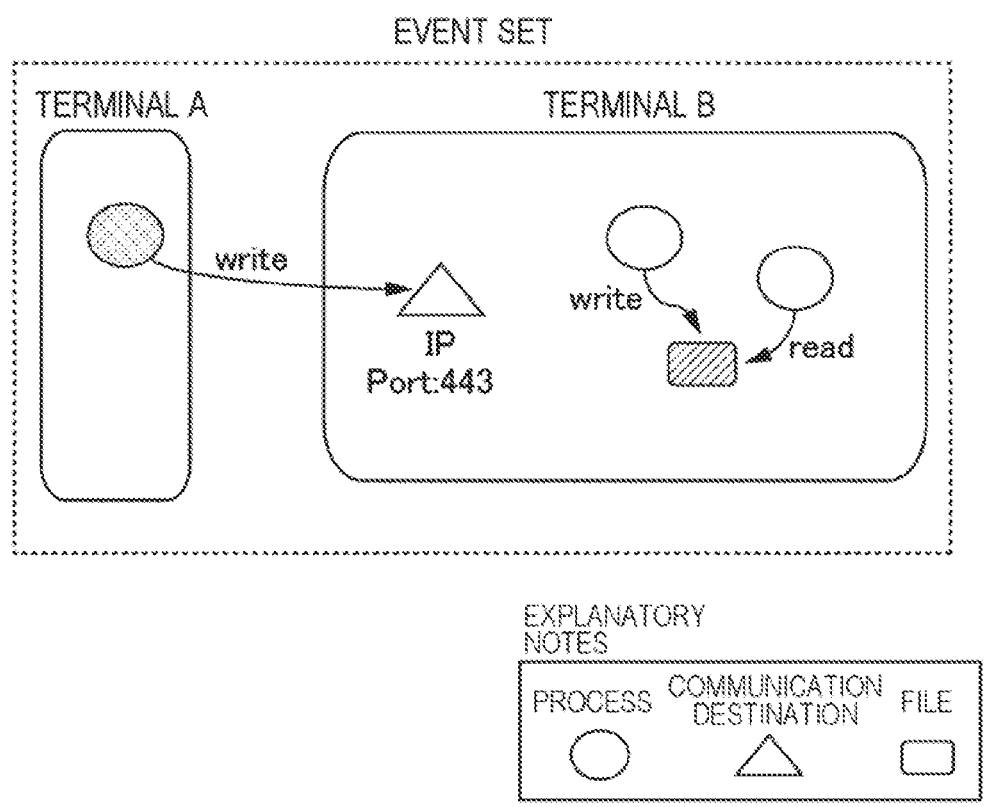
FIG. 7 is a diagram illustrating a method of constituting an event set.
Figure 8:
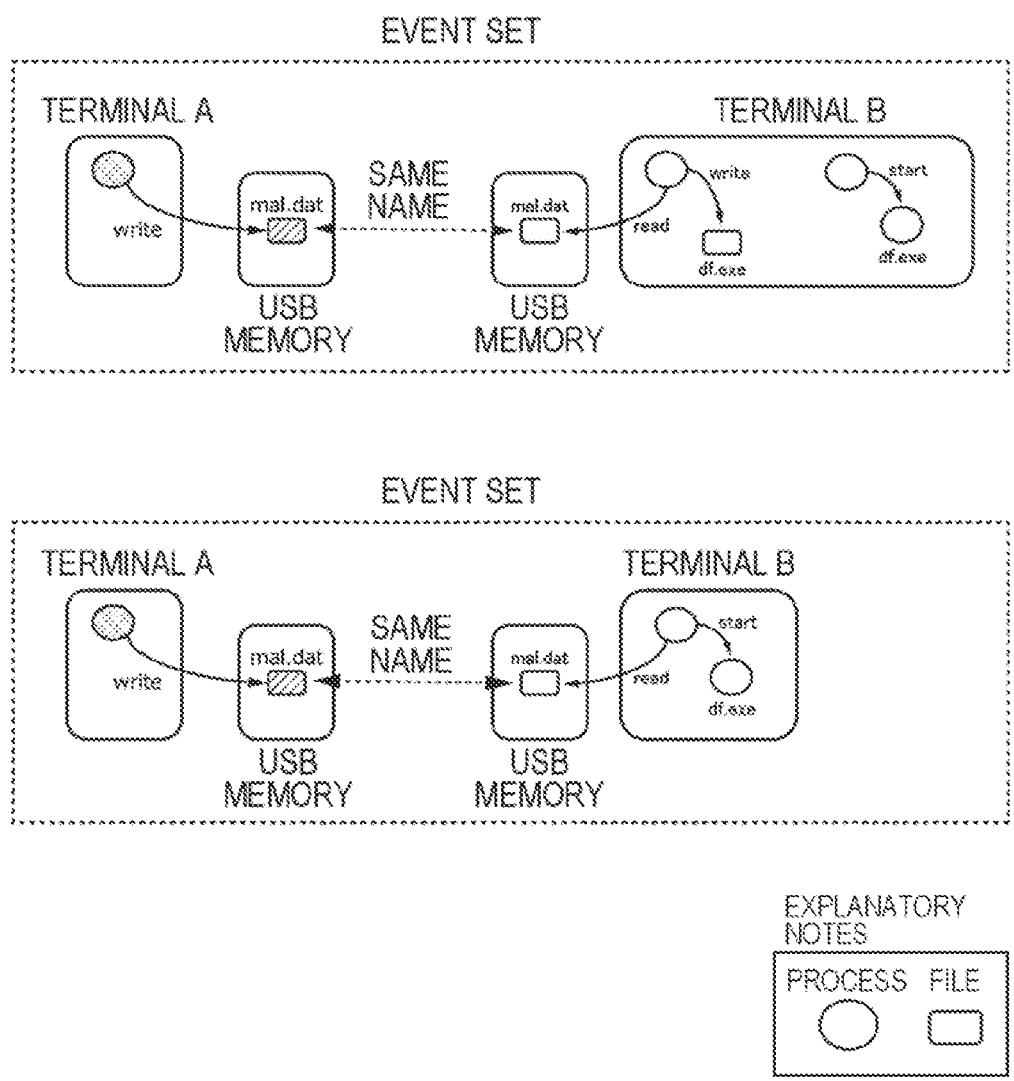
FIG. 8 is a diagram illustrating a method of constituting an event set.

For example, a method in which "an event related to a process or a file derived from a focused process is collectively included in one event set" can be adopted. FIG. 6 to FIG. 8 each is a diagram illustrating a method of constituting an event set. In FIG. 6, a plurality of events related to generation of a schedule task and a plurality of events related to execution of the schedule task are included in one event set. In other words, a process (a process illustrated with a dot pattern) of generating a schedule task is handled as a "focused process", and a process of executing the schedule task and a process generated by executing the schedule task are handled as a "process derived from a focused process". As a threat realized based on an event set illustrated as in FIG. 6, for example, a threat in that "after malware is generated, the malware is executed after a predetermined time" is conceivable.

In FIG. 7, an event of uploading a file from a terminal A onto a terminal B and an event of accessing the file are included in the same event set. In other words, a process (a process illustrated with a dot pattern) of uploading a file onto another terminal is handled as a "focused process", and a file (a file illustrated with oblique lines) uploaded by the process is handled as a "file derived from a focused process".

In FIG. 8, an event of storing a file in an external storage apparatus and an event of reading the file from the external storage apparatus and using the read file are included in the same event set. In other words, a process (a process illustrated with a dot pattern) of storing a file in an external storage apparatus is handled as a "focused process", and a file (a file illustrated with oblique lines) stored in the external storage apparatus is handled as a "file derived from a focused process". Note that, a process of reading a file stored in an external storage apparatus and a process of using the read file may be different (an upper example in FIG. 8) or may be the same (a lower example in FIG. 8).

Herein, an external storage apparatus may be a portable storage apparatus such as a USB memory and an SD card, or may be a stationary storage apparatus such as a network attached storage (NAS) (a USB memory in the example of FIG. 8).

Note that, as a "focused process", various processes can be adopted. For example, a process of a subject or an object of an event in which any abnormality is detected by an abnormality detection system provided in an inside or an outside of the warning apparatus 2000 is handled as a focused process. As the abnormality detection system, an existing system is usable. An abnormality detection system that executes an operation in that, for example, "an activity of a process that does not occur usually is determined as a rule, and an event matched with such a rule is detected as an abnormal event" is used.

<Regarding First Detected Event Information 10 and Second Detected Event Information 20>

First detected event information 10 is information representing an event set at a first degree of abstraction. The first detected event information 10 indicates, for example, identification information capable of uniquely determining each of a subject and an object of an event. Identification information of a process is, for example, a process ID and a name and a path of an executable file of a program achieving the process. Further, identification information of a file is, for example, a name and a path of a file.

Second detected event information 20 is information representing, at a degree of abstraction higher than that for first detected event information 10, an event set represented by the first detected event information 10. The second detected event information 20 indicates, for example, information representing, instead of identification information of a subject and an object of an event, a type of the subject and the object of the event. A type of a process can be represented, for example, by a type (a browser, document preparation software, spreadsheet software, or the like) of a program being executed as the process. A type of a file is, for example, an HTML file, a PDF file, a spreadsheet file, or the like.

Further, in the first detected event information 10 and the second detected event information 20, an activity content may be represented at different degrees of abstraction. When, for example, an activity content is writing (transmission) of data via a network, a method can be adopted in which, in the first detected event information 10, write using a specific communication protocol is indicated, and on the other hand, in the second detected event information 20, a communication protocol is not indicated but only write is simply indicated.

Note that, in the second detected event information 20, at least one of a subject, an object, and an activity content of an event may be represented at a degree of abstraction higher than that for first detected event information 10.

<Acquisition of First Detected Event Information 10: S102>

The first generation unit 2020 acquires first detected event information 10 (S102). There are various methods for acquiring, by the first generation unit 2020, the first detected event information 10. The first generation unit 2020 acquires, for example, the first detected event information 10 transmitted from another apparatus. In addition, the first generation unit 2020 may acquire the first detected event information 10, for example, by reading the first detected event information 10 from a storage apparatus.

Further, the first generation unit 2020 may acquire information (e.g., the event table 200 illustrated in FIG. 5) indicating each event having occurred in a target system, group the acquired events, and thereby generate one or more pieces of the first detected event information 10. Note that, as a method of recording an event having occurred in a system and a method of acquiring the recorded information, an existing method is usable. Further, a method of grouping events having occurred in a target system and consolidating (consolidating a plurality of events as one event set) the grouped events as an event set is as described above.

The first generation unit 2020 may generate the first detected event information 10 for all events having occurred in a target system or may generate the first detected event information 10 by focusing on a specific event. For example, by introducing the above-described abnormality detection system, an abnormal event may be detected and an event set may be generated only for the abnormal event. In other words, with respect to an event unrelated to an abnormal event, the first detected event information 10 is not generated.

In addition, for example, a focused event may be a previously defined event. Information defining a focused event is stored in a storage apparatus accessible from the first generation unit 2020.

<Generation of Second Detected Event Information 20: S104>

The first generation unit 2020 generates, from the first detected event information 10, second detected event information 20 (S104). Herein, a rule for generating the second detected event information 20 from the first detected event information 10 (i.e., a rule for converting representation of an event set from a first degree of abstraction to a second degree of abstraction) is previously determined.

It is assumed that, for example, in the first detected event information 10, a subject of an event is represented by identification information, and in the second detected event information 20, a subject of an event is represented by type information representing a type of the subject. In this case, for a conversion rule, conversion of identification information of a subject to type information and a conversion method for the identification information are previously determined. It is assumed that, for example, identification information of a subject is represented by an executable file name of a process and a type of the subject is represented by an extension. In this case, based on a conversion method of extracting an extension portion from an executable file name, identification information of a subject can be converted to type information of the subject.

<<Generation of Event Information Having Degree of Abstraction Higher Than Second Abstraction Level>>

The first generation unit 2020 may generate, in addition to the second detected event information 20, detected event information in which an event set represented by the first detected event information 10 is represented at a degree of abstraction higher than a second abstraction level. The first generation unit 2020 generates, for example, third detected event information in which an event set represented by the first detected event information is represented at a third abstraction level higher than a second abstraction level. Similarly, abstraction may be executed at a fourth abstraction level and a fifth abstraction level. In other words, the first generation unit 2020 generates, by using the first detected event information 10, the second detected event information to nth detected event information (n is an integer equal to or more than 2) in which an event set represented by the first detected event information 10 is represented at abstraction levels different from each other. Herein, as a value of n is larger, a degree of abstraction becomes higher.

Figure 9:
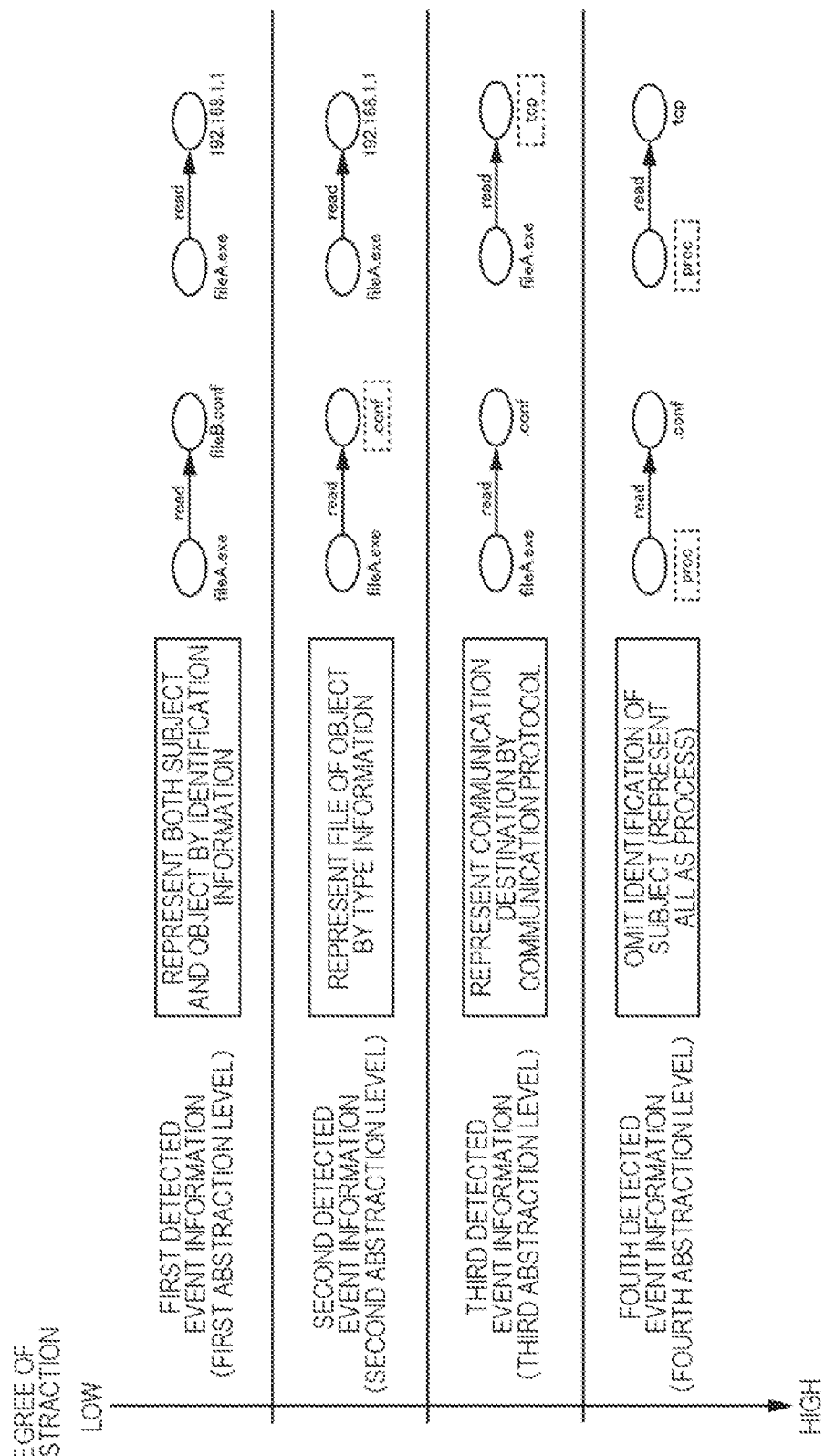
FIG. 9 is a diagram illustrating a case in which three or more abstraction levels are used.

FIG. 9 is a diagram illustrating a case in which three or more abstraction levels are used. In the first detected event information 10, each of a process, a file, and a terminal of a communication destination is represented by uniquely identifiable information. On the other hand, in the second detected event information 20, when an object is a process or a file, type information is used, instead of identification information. Further, with respect to third detected event information, in an event representing communication, information representing a communication protocol is indicated as an object, instead of identification information of a communication destination. And, in fourth detected event information, information representing a subject is omitted. In other words, a subject is not determined.

Note that, in a third abstraction level illustrated in FIG. 9, a communication protocol not only may be a communication protocol of a transport layer, but also may be a protocol of another layer (e.g., a protocol of a network layer such as an IP, a protocol of an application layer and the like such as HTTP, and the like).

Further, as illustrated in FIG. 9, depending on a content of abstraction, before and after abstraction, the content is not changed in some cases. When abstraction in that, for example, "a communication destination is represented by a communication protocol" is executed, an event set is not changed before and after the abstraction when an event representing communication is not included in an event set.

<Regarding Threat Information 30>

Threat information 30 is information indicating an event set representing a threat activity being an activity that becomes a threat to a computer system. The threat information 30 is information representing, for example, an activity of specific malware, an intrusion activity in which a specific security hole is attacked, and the like by using an event set constituting the activities. The threat information 30 can be generated, for example, by using, as a source, information relating to a threat activity actually found in a certain computer system and a threat activity found by a researcher or the like as being likely to occur in principle. As information (hereinafter, source information) becoming a source of the threat information 30 in this manner, information based on various forms, for example, such as a research paper, a report of a research activity with respect to security, a web page of a security-related company and the like, or an article contributed to a social networking service (SNS) is usable. Note that, the source information may be manually collected by a person generating the threat information 30 or may be automatically collected from a network by using a crawler or the like.

Threat information 30 representing a certain threat activity is constituted by a plurality of pieces of threat event information representing, at abstraction levels different from each other, an event set (hereinafter, a threat event set) constituting the threat activity. The threat information 30 includes at least first threat event information 32 representing, at a first abstraction level, an associated threat event set and second threat event information representing, at a second abstraction level, the threat event set. Further, similarly to detected event information, threat event information having a degree of abstraction higher than a second abstraction level may be included. Specifically, third threat event information representing, at a third abstraction level, a threat event set and fourth threat event information representing, at a fourth abstraction level, the threat event set may be included. In other words, the threat information 30 associated with one threat activity can include first threat event information to nth threat event information representing, at abstraction levels different from each other, an event set representing the threat activity (n is any integer equal to or more than 2).

The threat information 30 may include information other than threat event information. The threat information 30 includes, for example, an explanation for a threat activity represented by the threat information 30. An explanation for a threat activity includes, for example, information relating to a content of an attack, a target for an attack, vulnerability of a system hit by an attack, and the like. Further, the threat information 30 may include an indicator of compromise (IOC). An IOC is data representing a trace of an activity of malware and the like acquired from a system subjected to damage by malware and the like. An IOC includes, for example, a hash value of malware and the like, an IP address and a domain name of a communication destination of communication performed by malware, or the like.

Herein, generation of the threat information 30 using the source information may be manually executed or may be automatically executed by a computer (e.g., the warning apparatus 2000). Hereinafter, with regard to the latter, for easy description, description is made, assuming that the threat information 30 is generated by the warning apparatus 2000.

The warning apparatus 2000, for example, extracts an event from a sentence constituting the source information in accordance with a predetermined rule, and thereby generates an event set. Then, the warning apparatus 2000 generates, with respect to the extracted event set, first threat information to nth threat information. The warning apparatus 2000 generates, as the first threat event information, for example, information representing an event set at an abstraction level represented in the source information. Then, the warning apparatus 2000 generates, from the generated first threat event information, threat event information of another abstraction level.

Herein, as a technique for extracting an event from a sentence constituting the source information in accordance with a predetermined rule, an existing technique used in a field of natural language processing and the like is usable.

For example, an event extraction rule in which a set of words and a sentence and an event represented by the set and the sentence are associated is determined. Then, the warning apparatus 2000 extracts, by using the extraction rule, one or more events from the source information and defines a set of extracted events as a threat event set.

Note that, as a rule for executing conversion to higher threat event information such as a rule for converting first threat event information to second threat event information, a rule similar to a rule for converting detected event information to detected event information having a higher degree of abstraction is usable.

Further, the warning apparatus 2000 extracts, from the source information, an explanation for a threat activity, an IOC, and the like. A rule for achieving extraction thereof is also previously determined, similarly to a rule for extracting an event from the source information.

<Comparison Between Detected Event Information and Threat Information 30: S106>

The determination unit 2040 determines threat information 30 having a high degree of relevance to detected event information (S106). To do so, the determination unit 2040 computes a degree of relevance between an event set represented by detected event information and a threat event set represented by the threat information 30. Specifically, the determination unit 2040 computes a degree of relevance between detected event information and threat event information at the same abstraction level.

When, for example, certain threat information 30 is compared with detected event information, the determination unit 2040 compares, with respect to each n, nth detected event information with nth threat event information included in the threat information 30. In other words, for the first detected event information 10, a degree of relevance to the first threat event information 32 included in the threat information 30 is computed, and for the second detected event information 20, a degree of relevance to the second threat event information 34 included in the threat information 30 is computed. Hereinafter, a degree of relevance between nth threat event information included in the threat information 30 and nth detected event information is referred to as an nth degree of relevance.

The determination unit 2040 determines, from among pieces of threat information 30, threat information 30 in which any one or more of nth degrees of relevance computed for the threat information 30 are high (are equal to or more than a predetermined threshold) as threat information 30 having a high degree of relevance to detected event information.

<<Computation Method for Degree of Relevance>>

Hereinafter, a method of computing a degree of relevance between detected event information and threat event information is described. A degree of relevance between detected event information and threat event information can be computed, for example, as follows.

First, in detected event information and threat event information, data representing each event are referred to as event data. Event data are, for example, data in which a character string representing a subject of an event, a character string representing an object of an event, and a character string representing an activity content are coupled. Herein, when a character string in which a character string x and a character string y are coupled is represented as x+y, event data e1 of an event 1 in which a subject is s1, an object is o1, and an activity content is d1 are represented as e1=s1+o1+d1.

In the first detected event information 10 and the second detected event information 20, even when event sets represented by these pieces of information are the same, degrees of abstraction of representations for the event sets are different. Therefore, in these pieces of information, the same event is represented based on pieces of event data different from each other. It is assumed that, for example, there is an event 1 in which a process of an executable file being xyz.exe is a subject, a file being abc.txt is an object, and an activity content is read. And, it is assumed that in the first detected event information 10, an object is represented by identification information, and in the second detected event information 20, an object is represented by type information. In this case, event data e1 indicated by the first detected event information 10 are a character string being ""xyz.exe"+"abc.txt"+"read"". On the other hand, event data e2 indicated by the second detected event information 20 are a character string being ""xyz.exe"+"txt"+"read"".

The determination unit 2040 computes, based on a degree of overlap (a degree of matching) between a set of pieces of event data in detected event information and a set of pieces of event data in threat event information, a degree of relevance between the detected event information and the threat event information. When a degree of relevance is computed without considering an occurrence order of an event, a degree of relevance is computed, for example, by using a following equation (1) or equation (2).

[Math. 1]

$$x = \frac{|S|}{|E|} \quad (1)$$

$$x = \frac{\sum_{i \in S} w_i}{\sum_{j \in E} w_j} \quad (2)$$

Herein, x represents a degree of relevance. E is a set of pieces of event data indicated in threat event information. S is a set of pieces of event data matched with each other between threat event information and detected event information. A symbol ∥ represents the number of elements of a set. A symbol w is a weight added to event data. A weight added to each piece of event data is previously determined based on the threat information 30.

In the equation (1), a degree of relevance is determined as a value acquired by dividing the number of pieces of event data matched between threat event information and detected event information by a total number of events indicated in the threat event information. On the other hand, in the equation (2), a degree of relevance is determined as a value acquired by dividing a sum of weights added to pieces of event data matched between threat event information and detected event information by a sum of weights added to pieces of event data indicated in the threat event information. Herein, a method of judging whether pieces of event data are matched is described later.

When a degree of relevance is computed by considering an occurrence order of an event, the determination unit 2040 determines, for example, one or more overlaps of pieces of event data in which orders are matched between threat event information and detected event information. Hereinafter, for easy description, an event data set in which an order needs to be considered is also referred to as an event permutation.

It is assumed that, for example, in detected event information, an event permutation set being {a,b,c,d} is indicated, and in threat event information, an event permutation set being {b,d,c} is indicated. In this case, these event permutations have overlaps based on {b,d} and {b,c}. The reason is that in any either of the event permutations, d and c occur after b.

The determination unit 2040 computes, based on an event permutation ({b,d} and {b,c} in the above-described example) overlapping between detected event information and threat event information, a degree of relevance between these pieces of information. Specifically, by using a following equation (3) or (4), a degree of relevance is computed.

[Math. 2]

$$x = \frac{\max_{P' \in P}(|P'|)}{|E|} \quad (3)$$

$$x = \frac{\max_{P' \in P} \sum_{k \in P'} w_i}{\sum_{j \in E} w_j} \quad (4)$$

Herein, P is a set of event permutations (a set constituted by {b,d} and {b,c} in the above-described example) overlapping between detected event information and threat event information. Other symbols are similar to the equation (1) and the equation (2).

In the equation (3), a degree of relevance is determined as a value acquired by dividing a maximum value of the number of elements of event permutations overlapping between detected event information and threat event information by a total number of events indicated in the threat event information. On the other hand, in the equation (4), with regard to each of event permutations overlapping between detected event information and threat event information, a sum of weights of pieces of event data included in the event permutations is computed, and a degree of relevance is determined as a value acquired by dividing a maximum value of the computed sum by a sum of weights added to pieces of event data indicated in the threat event information.

Whether to consider an occurrence order of an event may be determined with respect to each piece of threat information or may be fixedly determined regardless of threat information. For threat information, for example, a flag indicating whether to consider an occurrence order of an event is set. Further, whether to consider an occurrence order of an event may be determined with respect to each piece of threat event information.

Note that, in threat event information, an occurrence order of some of events may be determined, instead of an occurrence order of all the events. In other words, this is a case where, in threat event information, an order is specified for some of event sets (an event permutation is indicated). For example, in threat event information including four events a, b, c, and d, it is conceivable that only an occurrence order in that "a certainly occurs before b" is determined.

In this case, the determination unit 2040 computes, for example, two degrees of relevance including 1) a degree of relevance between an event set indicated in threat event information and an event set indicated in detected event information and 2) a degree of relevance between an event permutation indicated in threat event information and an event permutation indicated in detected event information. The former is a degree of relevance in a case where an occurrence order of an event is not considered, and the latter is a degree of relevance in a case where an occurrence order of an event is considered. Then, the determination unit 2040 handles, as a degree of relevance between threat event information and detected event information, a statistical value (an average value, a maximum value, a minimum value, or the like) of two degrees of relevance being calculated.

<<Method of Judging Matching Between Pieces of Event Data>>

Judgement of whether pieces of event data are matched may be executed by comparing pieces of event data as they are (e.g., executing matching judgement between character strings) or may be executed after pieces of event data are converted to other pieces of data which are easily compared. In the latter case, the determination unit 2040 converts, for example, event data to a numerical value (event value) in accordance with any rule. As an event value, for example, a hash value is usable.

The determination unit 2040, for example, computes, with respect to event data indicated in each of event information and threat event information to be compared with each other, an event value of the event data, compares sets of event values, and thereby determines event data matched between the event information and the threat event information. However, preferably, event data indicated in threat event information is previously converted to an event value and is included in the threat event information.

<<Matching Judgement Further Using Additional Information>>

Depending on a type of a threat activity, by using not only a set of events but also another piece of additional information, it can be more accurately judged whether, in a target system, the threat activity is occurring. Therefore, the determination unit 2040 may judge, by using, in addition to an event set, another piece of additional information, whether detected event information and threat event information are matched.

Figure 10:
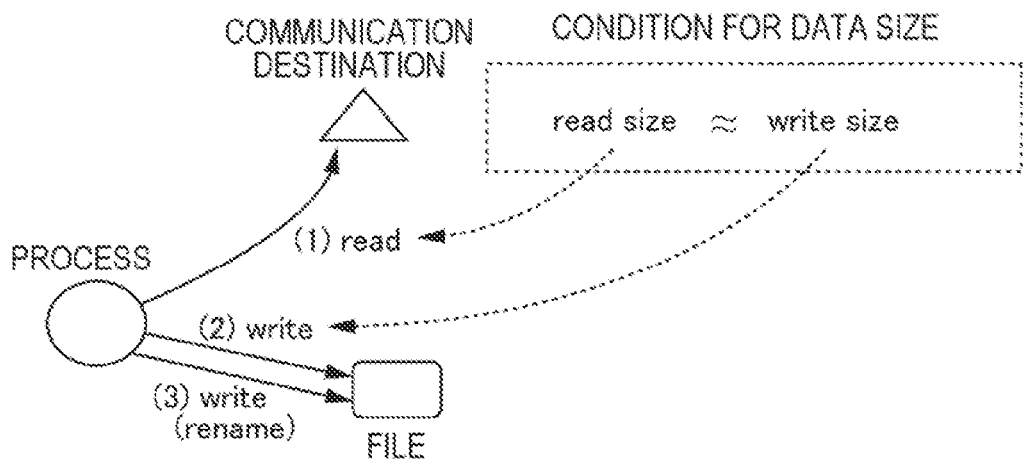
FIG. 10 is a diagram illustrating a case in which a threat activity is determined based on a size of data to be read/written in addition to an event set.
Figure 10:
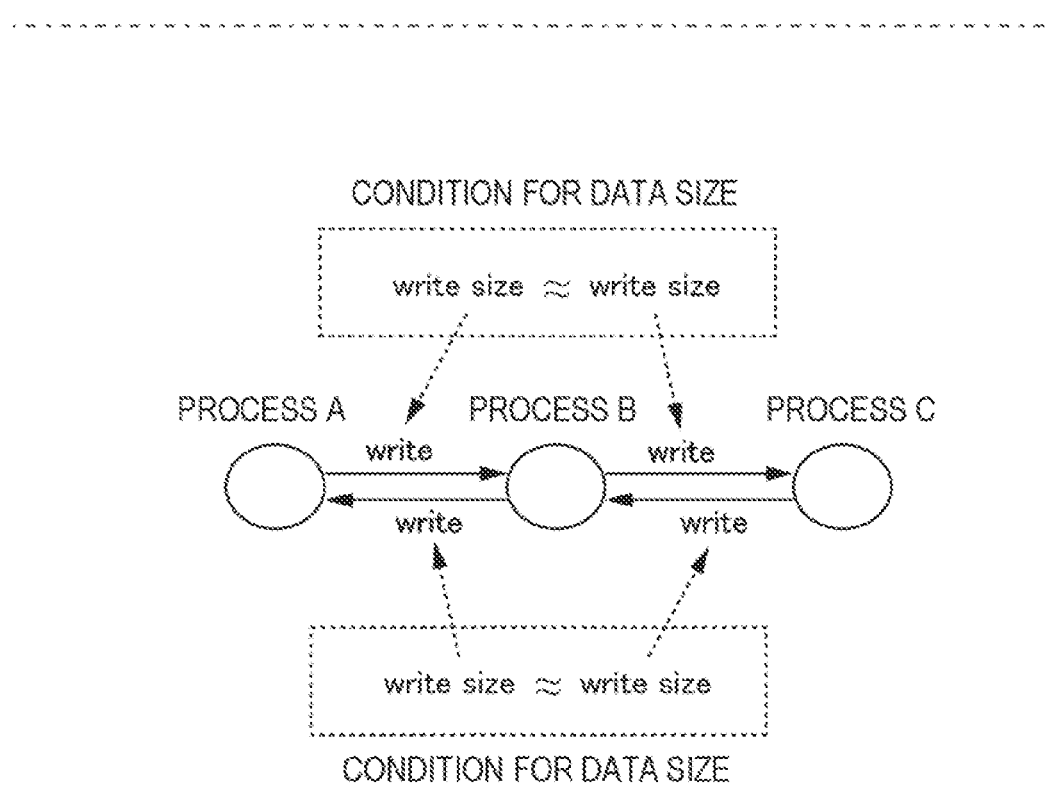

As additional information, for example, a size of data to be read/written is usable. FIG. 10 is a diagram illustrating a case where a threat activity is determined based on a size of data to be read/written in addition to an event set. An upper side of FIG. 10 illustrates download of a file. Download of a file is represented, for example, based on an event set in which 1) read is executed from a communication destination on a network, 2) read data are written onto a temporary file, and 3) finally, a name of the temporary file is modified to an original name. Herein, when only an event is considered, it is not understandable whether data read in 1) and data written in 2) are the same. For example, write onto a file in 2) and read of a file in 1) may be unrelated to each other.

In this example, when a content of data read in 1) and a content of data written in 2) are the same, it is conceivable that an event set representing download of a file is indicated. However, in FIG. 10, instead of comparing contents of data in this manner, sizes of data are compared. In other words, it is determined whether an event of read and an event of write as described above constitute an event set representing download of a file, by comparing a size of read date with a size of written data.

Specifically, when a size of read data is smaller than a size of written data, it is conceivable that an event of read and an event of write do not constitute an event set representing download of a file. On the other hand, when a size of read data is equal to or more than a size of written data, it is conceivable that an event of read and an event of write constitute an event set representing download of a file. Note that, the same applies to upload of data.

In this manner, when comparison of data sizes is executed instead of contents of data, an advantage in that a time required for comparison processing is short and an advantage in that it is unnecessary to record a content of data for comparison are achieved.

A lower side of FIG. 10 illustrates data transfer based on a mediator. Specifically, a process B mediates transmission/reception of data between processes A and C. In this example, when a condition in that "data which the process A writes for the process B are the same as data which the process B writes for the process C" is satisfied, it is indicated that the process B mediates data transmission from the process A to the process C. The same applied to a reverse flow.

However, actually, similarly to the example of download, as a condition for judging whether the process B mediates transmission of data, a condition for a data size in that "a size of data which the process A writes for the process B is substantially the same as a size of data which the process B writes for the process C" is preferably used.

As described above, in threat information 30 relating to a threat activity as illustrated in FIG. 10, in addition to an event set, a condition for a data size in read/write of data is determined. Further, in the first detected event information 10, a size of read/written data is indicated. Then, the determination unit 2040 computes a degree of matching between event sets based on the above-described method, and in addition, judges whether the above-described condition for a data size is satisfied.

Herein, there are various methods using a result of judgement of a condition for a data size. The determination unit 2040, for example, does not determine, when, with respect to threat information 30 and detected event information, the above-described condition for a data size is not satisfied, that the threat information 30 has a high degree of relevance to the detected event information, regardless of a degree of matching between event sets.

In addition, the determination unit 2040, for example, corrects, in response to whether a condition for a data size is satisfied, a value of a degree of relevance computed based on a degree of matching between event sets. The determination unit 2040, for example, multiplies, when the above-described condition for a data size is not satisfied, a degree of relevance computed based on a degree of matching between event sets by a predetermined correction coefficient having a value larger than 0 and smaller than 1, and thereby corrects the degree of relevance to a smaller value.

<Generation of Warning Information: S108>

The second generation unit 2060 generates, based on threat information 30 determined by the determination unit 2040 and a matching level of the information, warning information 40 (S108). When, for example, it is determined that the first threat event information 32 included in certain threat information 30 has a high degree of relevance to the first detected event information 10, the warning information 40 is generated based on the threat information 30 and a matching level being a "first abstraction level". Herein, a specific using method for a matching level is described later.

The second generation unit 2060 includes, in the warning information 40, for example, an explanation for a threat represented by the threat information 30 and a countermeasure against the threat. An explanation for a threat and a countermeasure are previously included in the threat information 30.

Herein, in an explanation for a threat, a description for an event matched between detected event information and the threat information 30 is preferably emphasized. As a method for emphasis, for example, methods of using a font color different from that of another description and of adding an underline or a frame border are available.

In addition, the second generation unit 2060 may include, in the warning information 40, for example, information representing an event matched between detected event information and the threat information 30. Specifically, graph representation of an event set represented by detected event information is included in the warning information 40, and in the graph, an event matched with the threat information 30 is emphatically displayed.

Figure 11:
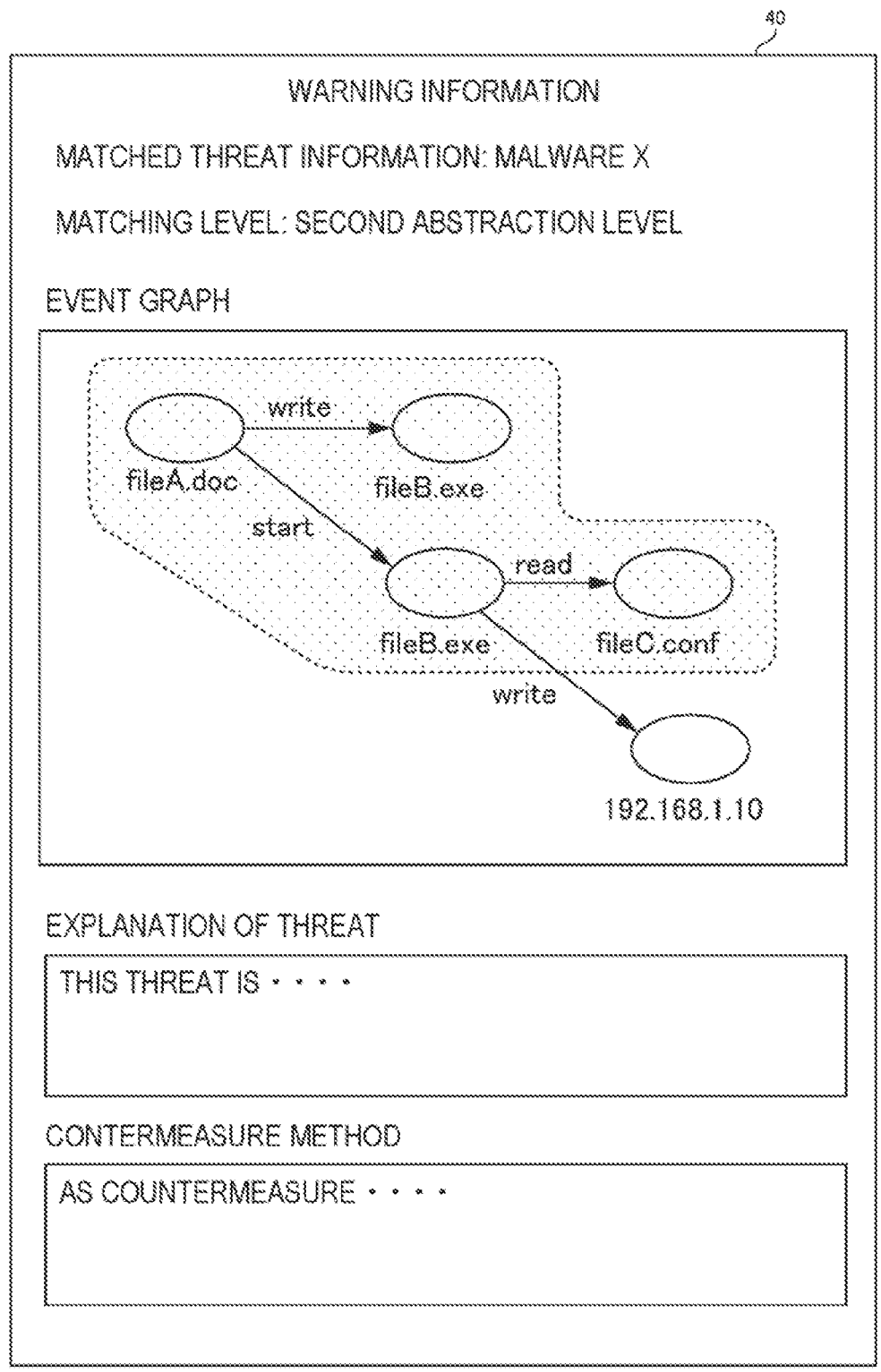
FIG. 11 is a diagram illustrating warning information.

FIG. 11 is a diagram illustrating the warning information 40. In the warning information 40 in FIG. 11, a name (outline) of the threat information 30, a matching level, graph representation of an event represented by the first detected event information 10, an explanation for a threat, and an explanation for a countermeasure method are included. Further, in the graph of events, an event matched with the threat information 30 is surrounded with a frame applied with a dot pattern.

A matching level can be used, when an explanation for a threat and a graph of events are emphasized, for determining a form of the emphasis. In other words, the second generation unit 2060 causes a method for emphasis to be different in response to a matching level. For example, as a matching level is lower, emphasis in an explanation for a threat and a graph of events is more strongly made. Strength of emphasis can be increased, for example, by causing a color to be a more noticeable color, by causing a thickness of an underline, a frame border, or the like to be thicker, and the like.

Herein, the number of pieces of threat information 30 determined by the determination unit 2040 may be not one but plural. In this case, the second generation unit 2060 may generate the warning information 40 with respect to all pieces of determined threat information 30 or may generate the warning information 40 with respect to some pieces of determined threat information 30.

In the latter case, first, the second generation unit 2060 considers a matching level with respect to each piece of threat information 30. In other words, the second generation unit 2060 generates the warning information 40 by prioritizing, from among pieces of threat information 30 in which a degree of relevance to detected event information is determined to high, threat information 30 having a low matching level of the information. The second generation unit 2060 generates, for example, the warning information 40 for only threat information 30 falling within a predetermined rank order when pieces of determined threat information 30 are sorted in ascending order in terms of a matching level.

Further, the second generation unit 2060 may consider, in addition to a matching level, a height of a degree of relevance. In other words, the second generation unit 2060 sorts pieces of determined threat information 30 in ascending order in terms of a matching level, and generates the warning information 40 for only threat information 30 falling within a predetermined rank order when pieces of threat information 30 having the same matching level are further sorted in descending order in terms of a degree of relevance. Note that, a "predetermined rank order" is previously stored in a storage apparatus accessible from the determination unit 2040.

<Output of Warning Information 40: S110>

The output unit 2080 outputs the warning information 40 (S110). Herein, any output form of the warning information 40 is applicable. The output unit 2080, for example, displays the warning information 40 in a display apparatus connected to the warning apparatus 2000. In addition, the output unit 2080, for example, may store the warning information 40 in any storage apparatus. In addition, the output unit 2080, for example, may transmit the warning information 40 to an apparatus other than the warning apparatus 2000. The warning information 40 is transmitted, for example, to a terminal of an administrator or the like of a target system. An administrator or the like of the target system operates the terminal, and thereby browses the warning information 40 by using a display apparatus connected to the terminal.

<Feedback From User>

The warning apparatus 2000 may receive, with respect to the output warning information 40, a feedback from a user. Specifically, it is assumed that the warning information 40 includes information (a graph of events in FIG. 11, or the like) representing an event matched between detected event information and threat information 30. In this case, it is assumed that a user determines that a detected event does not represent a threat. In this case, a user issues an input indicating that a detected event does not represent a threat (i.e., a warning is erroneous) to the warning apparatus 2000. The warning apparatus 2000 executes, based on the input, processing of decreasing a degree of importance of the detected event (e.g., updating a degree of importance of the event to a value acquired by multiplying a current value by a predetermined coefficient having a value smaller than 1). By doing so, the warning apparatus 2000 can generate more accurate warning information 40, by using knowledge of a user.

Similarly, the warning apparatus 2000 may receive, from a user, an input indicating that a warning is correct. In this case, the warning apparatus 2000 executes processing of increasing a degree of importance of an event include in detected event information included in the warning information 40 (e.g., updating a degree of importance of the event to a value acquired by multiplying a current value by a predetermined coefficient larger than 1).

Modified Example

The warning apparatus 2000 may further use information representing a normal activity of a target system. This information is referred to as normal information. The normal information represents, based on an event set, a normal activity of a target system. More specifically, the normal information includes a plurality of pieces of normal event information representing, at abstraction levels different from each other, the same event set. Hereinafter, a normal event set representing, at an nth abstraction level, an event set associated with the normal information is referred to as an nth normal event set.

The determination unit 2040 computes a degree of relevance between detected event information and threat event information, and in addition, computes a degree of relevance between the detected event information and normal event information. Specifically, the determination unit 2040 computes, with respect to each piece of normal information, a degree of relevance between nth normal event information included in the normal information and nth detected event information. Note that, as a method of computing a degree of relevance between detected event information and normal event information, the same method as a method of computing a degree of relevance between detected event information and threat event information is usable.

The warning apparatus 2000 controls generation and output of the warning information 40, based on a degree of relevance between detected event information and normal information. The second generation unit 2060, for example, includes, in warning information, information relating to normal information having a high degree of relevance to detected event information. However, information relating to normal information may be included in warning information only when it is conceivable that a probability in that detected event information represents a normal activity is higher than a probability in that detected event information represents a threat activity. In addition, the second generation unit 2060, for example, may not necessarily generate the warning information 40 when it is conceivable that a probability in that detected event information represents a normal activity is higher than a probability in that detected event information represents a threat activity.

Herein, there are various methods of judging whether a probability in that detected event information represents a normal activity is higher than a probability in that detected event information represents a threat activity. The second generation unit 2060 determines, for example, from among pieces of normal event information in which a degree of relevance to detected event information is equal to or more than a predetermined value, normal event information having a minimum abstraction level. Similarly, the second generation unit 2060 determines, from among pieces of threat event information in which a degree of relevance to detected event information is equal to or more than a predetermined value, threat event information having a minimum abstraction level. By doing so, normal event information matched with detected event information at a lowest degree of abstraction (based on most specific representation) and threat event information matched with detected event information at a lowest degree of abstraction (based on most specific representation) are determined.

First, the second generation unit 2060 compares an abstraction level of determined normal event information with an abstraction level of determined threat event information. When the abstraction level of the determined normal event information is lower than the abstraction level of the determined threat event information, the second generation unit 2060 judges that a probability in that detected event information represents a normal activity is higher. On the other hand, when the abstraction level of the determined normal event information is higher than the abstraction level of the threat event information, the second generation unit 2060 judges that a probability in that detected event information represents a threat activity is higher.

When the abstraction level of the determined normal event information is equal to the abstraction level of the detected threat event information, the second generation unit 2060 compares degrees of relevance computed for these pieces of information. When a degree of relevance computed for the normal event information is larger than a degree of relevance computed for the threat event information, the second generation unit 2060 judges that a probability in that the detected event information represents a normal activity is higher. On the other hand, when the degree of relevance computed for the normal event information is equal to or less than the degree of relevance computed for the threat event information, the second generation unit 2060 judges that a probability in that the detected event information represents a threat activity is higher.

While example embodiments of the present invention have been described with reference to the drawings, these example embodiments are only illustrative of the present invention, and combinations of the above-described example embodiments or various configurations other than the above-described configurations can also be adopted.

The whole or part of the example embodiments disclosed above can be described as, but not limited to, the following supplementary notes.

1. A warning apparatus including:
   a first generation unit that acquires first detected event information representing, at a first abstraction level, an event set being a set of events having occurred in a target system, and generates second detected event information representing, at a second abstraction level, the event set represented by the acquired first detected event information;
   a determination unit that determines, from among a plurality of pieces of threat information each representing a threat activity, the threat information having a high degree of relevance to at least either of the first detected event information and the second detected event information; and
   a second generation unit that generates warning information relating to a threat being occurring in the target system, based on the determined threat information and a matching level being an abstraction level associated with the detected event information having a high degree of relevance to the threat information.

2. The warning apparatus according to supplementary note 1., in which
   the event represents an activity of a process operating on the target system.

3. The warning apparatus according to supplementary note 1. or 2., in which,
   in the event set represented at the first abstraction level, identification information is indicated with respect to an executable file of a process being a subject of an event or a file being an object of an event, and,
   in the event set represented at the second abstraction level, a type is indicated with respect to an executable file of a process being a subject of an event or a file being an object of an event.

4. The warning apparatus according to any one of supplementary notes 1. to 3., in which
   the threat information includes first threat event information representing, at a first degree of abstraction, an event set represented by the threat information and second threat event information representing, at a second degree of abstraction, the event set represented by the threat information, and
   the determination unit
      computes a first degree of relevance between the first detected event information and the first threat event information of each piece of the threat information,
      computes a second degree of relevance between the second detected event information and the second threat event information of each piece of the threat information, and
      determines the threat information in which at least either of the first degree of relevance and the second degree of relevance is equal to or more than a threshold.

5. The warning apparatus according to supplementary note 4., in which
   the first generation unit generates, when the threat information in which the first degree of relevance is equal to or more than a threshold does not exist, the second detected event information.

6. The warning apparatus according to supplementary note 4. or 5., in which
   the determination unit divides a total number of events matched between the event set indicated in the detected event information and the event set indicated in the threat event information by a total number of events included in the event set indicated in the threat event information, and thereby computes a degree of relevance between the detected event information and the threat event information, 7. The warning apparatus according to supplementary note 4. or 5., in which
   the determination unit divides a sum of weights added to each of events matched between the event set indicated in the detected event information and the event set indicated in the threat event information by a sum of weights added to each of events included in the event set indicated in the threat event information, and thereby computes a degree of relevance between the detected event information and the threat event information.

8. The warning apparatus according to any one of supplementary notes 4. to 7., in which
   the threat event information indicates an event value representing, with respect to each event, the event by using a numerical value, and
   the determination unit
      computes, with respect to each event indicated in the detected event information, an event value representing the event by using a numerical value, and
      compares each event value indicated in the detected event information with each event value indicated in the threat event information, and thereby judges whether an event indicated in the detected event information and an event indicated in the threat event information are matched.

9. The warning apparatus according to any one of supplementary notes 4. to 8., in which
   the threat event information indicates a condition for a size of data handled in an event included in the event set, and
   the determination unit computes a degree of relevance between the detected event information and the threat event information, based on a degree of matching of events between the event set indicated in the detected event information and the event set indicated in the threat event information and a result of judgement whether the condition indicated in the threat event information is satisfied in an event indicated by the detected event information.

10. The warning apparatus according to any one of supplementary notes 1. to 9., in which
    the warning information includes information in which events matched between the detected event information and the determined threat information are emphasized at a degree in response to the matching level.

11. A control method executed by a computer, the method including:
    a first generation step of acquiring first detected event information representing, at a first abstraction level, an event set being a set of events having occurred in a target system, and generating second detected event information representing, at a second abstraction level, the event set represented by the acquired first detected event information;
    a determination step of determining, from among a plurality of pieces of threat information each representing a threat activity, the threat information having a high degree of relevance to at least either of the first detected event information and the second detected event information; and a second generation step of generating warning information relating to a threat being occurring in the target system, based on the determined threat information and a matching level being an abstraction level associated with the detected event information having a high degree of relevance to the threat information.

12. The control method according to supplementary note 11., in which
the event represents an activity of a process operating on the target system.

13. The control method according to supplementary note 11. or 12., in which,
in the event set represented at the first abstraction level, identification information is indicated with respect to an executable file of a process being a subject of an event or a file being an object of an event, and
in the event set represented at the second abstraction level, a type is indicated with respect to an executable file of a process being a subject of an event or a file being an object of an event.

14. The control method according to any one of supplementary notes 11. to 13., in which
the threat information includes first threat event information representing, at a first degree of abstraction, an event set represented by the threat information and second threat event information representing, at a second degree of abstraction, the event set represented by the threat information, and
in the determination step,
  a first degree of relevance between the first detected event information and the first threat event information of each piece of the threat information is computed,
  a second degree of relevance between the second detected event information and the second threat event information of each piece of the threat information is computed, and
  the threat information in which at least either of the first degree of relevance and the second degree of relevance is equal to or more than a threshold is determined.

15. The control method according to supplementary note 14., in which
in the first generation step, the second detected event information is generated when the threat information in which the first degree of relevance is equal to or more than a threshold does not exist.

16. The control method according to supplementary note 14. or 15., in which
in the determination step, a total number of events matched between the event set indicated in the detected event information and the event set indicated in the threat event information is divided by a total number of events included in the event set indicated in the threat event information, and thereby a degree of relevance between the detected event information and the threat event information is computed.

17. The control method according to supplementary note 14. or 15., in which
in the determination step, a sum of weights added to each of events matched between the event set indicated in the detected event information and the event set indicated in the threat event information is divided by a sum of weights added to each of events included in the event set indicated in the threat event information, and thereby a degree of relevance between the detected event information and the threat event information is computed.

18. The control method according to any one of supplementary notes 14. to 17., in which
the threat event information indicates an event value representing, with respect to each event, the event by using a numerical value, and
in the determination step,
  with respect to each event indicated in the detected event information, an event value representing the event by using a numerical value is computed, and
  each event value indicated in the detected event information with each event value indicated in the threat event information is compared, and thereby whether an event indicated in the detected event information and an event indicated in the threat event information are matched is judged.

19. The control method according to any one of supplementary notes 14. to 18., in which
the threat event information indicates a condition for a size of data handled in an event included in the event set, and
in the determination step, a degree of relevance between the detected event information and the threat event information is computed based on a degree of matching of events between the event set indicated in the detected event information and the event set indicated in the threat event information and a result of judgement whether the condition indicated in the threat event information is satisfied in an event indicated by the detected event information.

20. The control method according to any one of supplementary notes 11. to 19., in which
the warning information includes information in which events matched between the detected event information and the determined threat information are emphasized at a degree in response to the matching level.

21. A program causing a computer to execute each of steps of the control method according to any one of supplementary notes 11. to 20.

What is claimed is:

1. A warning apparatus comprising:
at least one memory configured to store instructions; and
at least one processor configured to execute the instructions to perform operations comprising;
acquiring first detected event information representing, at a first abstraction level, an event set being a set of events having occurred in a target system, and generating second detected event information representing, at a second abstraction level, the event set represented by the acquired first detected event information;
determining, from among a plurality of pieces of threat information each representing a threat activity, the threat information having a high degree of relevance to at least either of the first detected event information and the second detected event information; and
generating warning information relating to a threat being occurring in the target system, based on the determined threat information and a matching level being an abstraction level associated with the detected event information having a high degree of relevance to the threat information.

2. The warning apparatus according to claim 1, wherein the event represents an activity of a process operating on the target system.

3. The warning apparatus according to claim 1, wherein,
in the event set represented at the first abstraction level,
identification information is indicated with respect to
an executable file of a process being a subject of an
event or a file being an object of an event, and,
in the event set represented at the second abstraction level,
a type is indicated with respect to an executable file of
a process being a subject of an event or a file being an
object of an event.

4. The warning apparatus according to claim 1, wherein
the threat information includes first threat event information representing, at a first degree of abstraction, an event set represented by the threat information and second threat event information representing, at a second degree of abstraction, the event set represented by the threat information, and
the operations further comprise:
computing a first degree of relevance between the first detected event information and the first threat event information of each piece of the threat information,
computing a second degree of relevance between the second detected event information and the second threat event information of each piece of the threat information, and
determining the threat information in which at least either of the first degree of relevance and the second degree of relevance is equal to or more than a threshold.

5. The warning apparatus according to claim 4, wherein
the operations further comprise generating, when the threat information in which the first degree of relevance is equal to or more than a threshold does not exist, the second detected event information.

6. The warning apparatus according to claim 4, wherein
the operations further comprise dividing a total number of events matched between the event set indicated in the detected event information and the event set indicated in the threat event information by a total number of events included in the event set indicated in the threat event information, and thereby computing a degree of relevance between the detected event information and the threat event information.

7. The warning apparatus according to claim 4, wherein
the operations further comprise dividing a sum of weights added to each of events matched between the event set indicated in the detected event information and the event set indicated in the threat event information by a sum of weights added to each of events included in the event set indicated in the threat event information, and thereby computing a degree of relevance between the detected event information and the threat event information.

8. The warning apparatus according to claim 4, wherein
the threat event information indicates an event value representing, with respect to each event, the event by using a numerical value, and
the operations further comprise:
computing, with respect to each event indicated in the detected event information, an event value representing the event by using a numerical value, and
comparing each event value indicated in the detected event information with each event value indicated in the threat event information, and thereby judging whether an event indicated in the detected event information and an event indicated in the threat event information are matched.

9. The warning apparatus according to claim 4, wherein
the threat event information indicates a condition for a size of data handled in an event included in the event set, and
the operations further comprise computing a degree of relevance between the detected event information and the threat event information, based on a degree of matching of events between the event set indicated in the detected event information and the event set indicated in the threat event information and a result of judgement whether the condition indicated in the threat event information is satisfied in an event indicated by the detected event information.

10. The warning apparatus according to claim 1, wherein
the warning information includes information in which events matched between the detected event information and the determined threat information are emphasized at a degree in response to the matching level.

11. A control method executed by a computer, the method comprising:
a first generation step of acquiring first detected event information representing, at a first abstraction level, an event set being a set of events having occurred in a target system, and generating second detected event information representing, at a second abstraction level, the event set represented by the acquired first detected event information;
a determination step of determining, from among a plurality of pieces of threat information each representing a threat activity, the threat information having a high degree of relevance to at least either of the first detected event information and the second detected event information; and
a second generation step of generating warning information relating to a threat being occurring in the target system, based on the determined threat information and a matching level being an abstraction level associated with the detected event information having a high degree of relevance to the threat information.

12. The control method according to claim 11, wherein
the event represents an activity of a process operating on the target system.

13. The control method according to claim 11, wherein
in the event set represented at the first abstraction level, identification information is indicated with respect to an executable file of a process being a subject of an event or a file being an object of an event, and
in the event set represented at the second abstraction level, a type is indicated with respect to an executable file of a process being a subject of an event or a file being an object of an event.

14. The control method according to claim 11, wherein
the threat information includes first threat event information representing, at a first degree of abstraction, an event set represented by the threat information and second threat event information representing, at a second degree of abstraction, the event set represented by the threat information, and
in the determination step,
a first degree of relevance between the first detected event information and the first threat event information of each piece of the threat information is computed,
a second degree of relevance between the second detected event information and the second threat event information of each piece of the threat information is computed, and the threat information in which at least either of the first degree of relevance and the second degree of relevance is equal to or more than a threshold is determined.

15. The control method according to claim 14, wherein in the first generation step, the second detected event information is generated when the threat information in which the first degree of relevance is equal to or more than a threshold does not exist.

16. The control method according to claim 14, wherein in the determination step, a total number of events matched between the event set indicated in the detected event information and the event set indicated in the threat event information is divided by a total number of events included in the event set indicated in the threat event information, and thereby a degree of relevance between the detected event information and the threat event information is computed.

17. The control method according to claim 14, wherein in the determination step, a sum of weights added to each of events matched between the event set indicated in the detected event information and the event set indicated in the threat event information is divided by a sum of weights added to each of events included in the event set indicated in the threat event information, and thereby a degree of relevance between the detected event information and the threat event information is computed.

18. The control method according to claim 14, wherein the threat event information indicates an event value representing, with respect to each event, the event by using a numerical value, and in the determination step,
with respect to each event indicated in the detected event information, an event value representing the event by using a numerical value is computed, and
each event value indicated in the detected event information with each event value indicated in the threat event information is compared, and thereby whether an event indicated in the detected event information and an event indicated in the threat event information are matched is judged.

19. The control method according to claim 14, wherein the threat event information indicates a condition for a size of data handled in an event included in the event set, and in the determination step, a degree of relevance between the detected event information and the threat event information is computed based on a degree of matching of events between the event set indicated in the detected event information and the event set indicated in the threat event information and a result of judgement whether the condition indicated in the threat event information is satisfied in an event indicated by the detected event information.

20. The control method according to claim 11, wherein the warning information includes information in which events matched between the detected event information and the determined threat information are emphasized at a degree in response to the matching level.

21. A non-transitory computer readable medium storing a program causing a computer to execute each of steps of a control method, the method comprising:

acquiring first detected event information representing, at a first abstraction level, an event set being a set of events having occurred in a target system, and generating second detected event information representing, at a second abstraction level, the event set represented by the acquired first detected event information;

determining, from among a plurality of pieces of threat information each representing a threat activity, the threat information having a high degree of relevance to at least either of the first detected event information and the second detected event information; and generating warning information relating to a threat being occurring in the target system, based on the determined threat information and a matching level being an abstraction level associated with the detected event information having a high degree of relevance to the threat information.

* * * * *